(No Model.) 6 Sheets—Sheet 1.

J. S. MERCER & W. GREATREX.
HARVESTER BINDER.

No. 503,798. Patented Aug. 22, 1893.

Witnesses
J. Edw. Maybee
F. A. Woodward

Inventors
John S. Mercer
Wm Greatrex
by Donald C. Ridout & Co.
Attys.

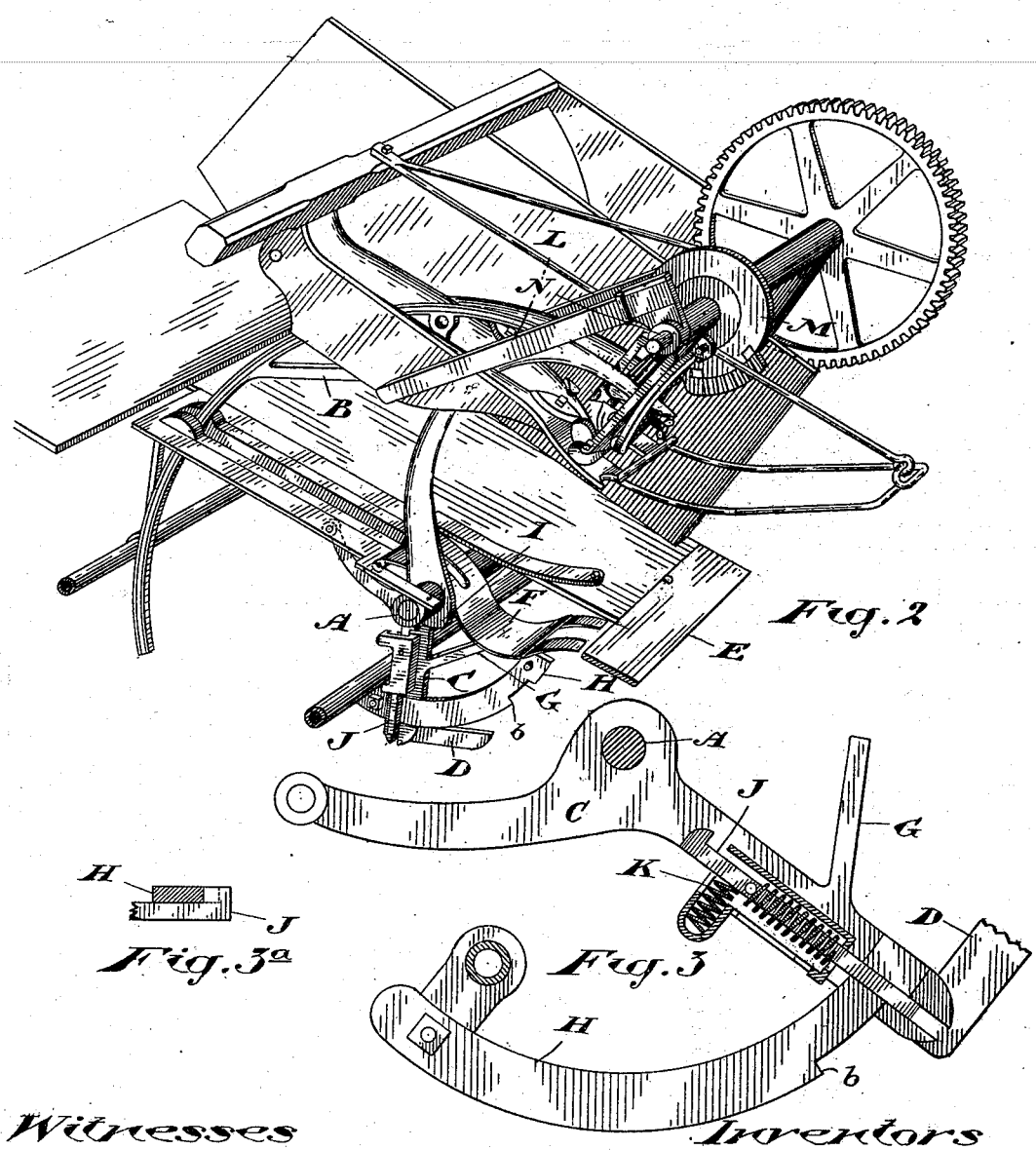

(No Model.) 6 Sheets—Sheet 3.

J. S. MERCER & W. GREATREX.
HARVESTER BINDER.

No. 503,798. Patented Aug. 22, 1893.

Witnesses  
J. Edw. Maybee  
J. A. Woodward

Inventors  
John S. Mercer  
Wm. Greatrex  
by Donald C. Ridout & Co.  
Attys.

(No Model.) 6 Sheets—Sheet 4.

J. S. MERCER & W. GREATREX.
HARVESTER BINDER.

No. 503,798. Patented Aug. 22, 1893.

Witnesses
J. Edw. Maybee
F. A. Woodward

Inventors
John S. Mercer
Wm Greatrex
by Donald C. Ridout & Co.
Attys (No Model.) 6 Sheets—Sheet 5.

J. S. MERCER & W. GREATREX.
HARVESTER BINDER.

No. 503,798. Patented Aug. 22, 1893.

Witnesses
J. Edw. Maybee
F. A. Woodward

Inventors
John S. Mercer
Wm. Greatrex
by Donald C. Ridout & Co.
Att'ys (No Model.) 6 Sheets—Sheet 6.
J. S. MERCER & W. GREATREX.
HARVESTER BINDER.
No. 503,798. Patented Aug. 22, 1893.
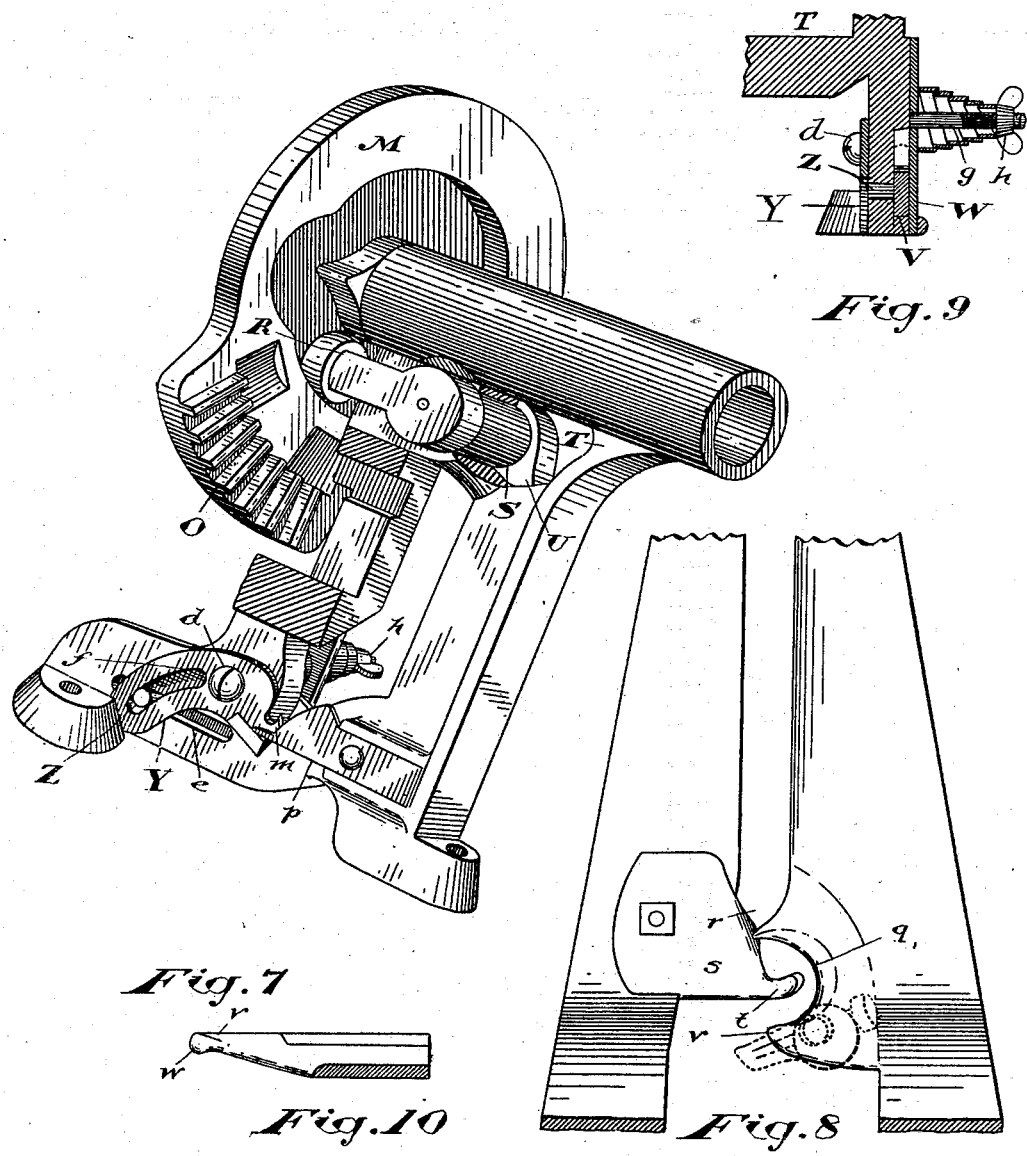
Witnesses
A. Edw. Maybee
F. A. Woodward
Inventors
John S. Mercer
Wm. Greatrex
by Donald C. Ridout & Co.
Atty's

UNITED STATES PATENT OFFICE.

JOHN S. MERCER AND WILLIAM GREATREX, OF ALLISTON, CANADA, ASSIGNORS TO MERCER BROS. & CO., OF SAME PLACE.

HARVESTER-BINDER.

SPECIFICATION forming part of Letters Patent No. 503,798, dated August 22, 1893.

Application filed October 20, 1891. Serial No. 409,287. (No model.)

*To all whom it may concern:*

Be it known that we, JOHN SMITH MERCER and WILLIAM GREATREX, both of the town of Alliston, in the county of Simcoe, in the Province of Ontario, Canada, have jointly invented a certain new and useful Improvement in Harvester-Binders, of which the following is a specification.

The object of the invention is to improve and simplify the mechanism by which the sheaf is compressed and the cord tied upon it, and it consists, essentially, in the construction and arrangement of the parts hereinafter explained and then definitely claimed.

Figure 1:
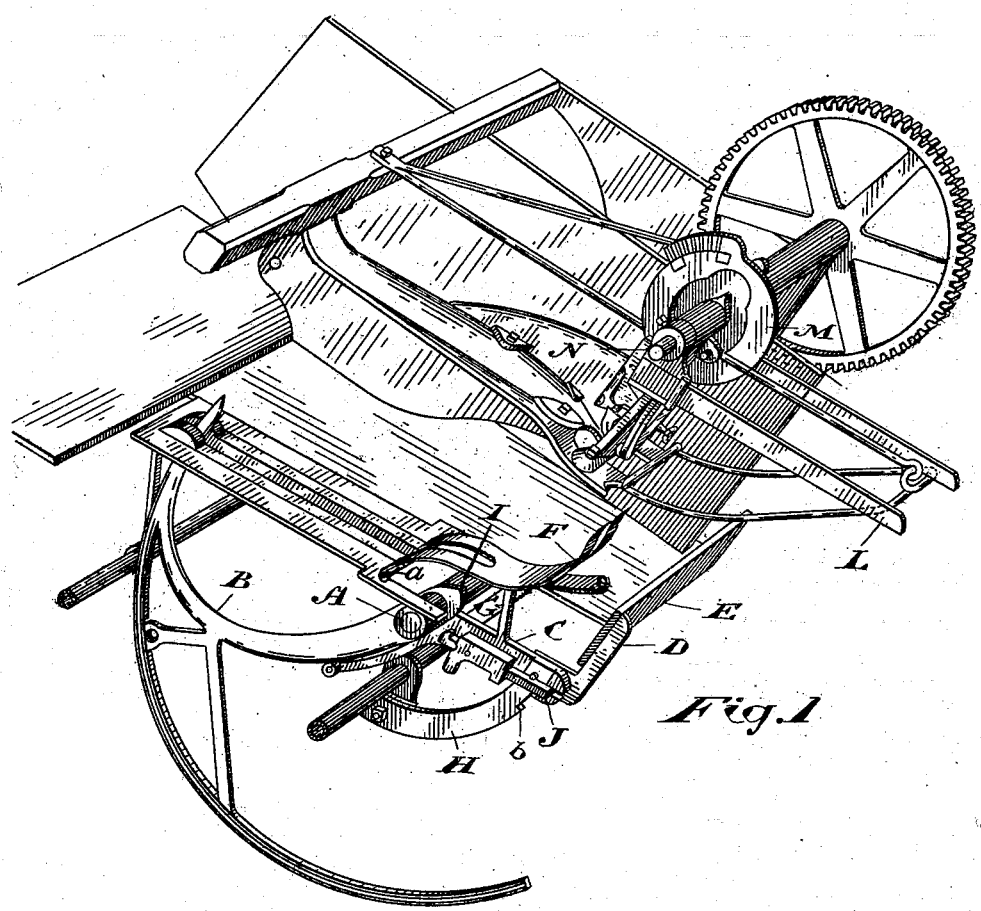
Figure 4:
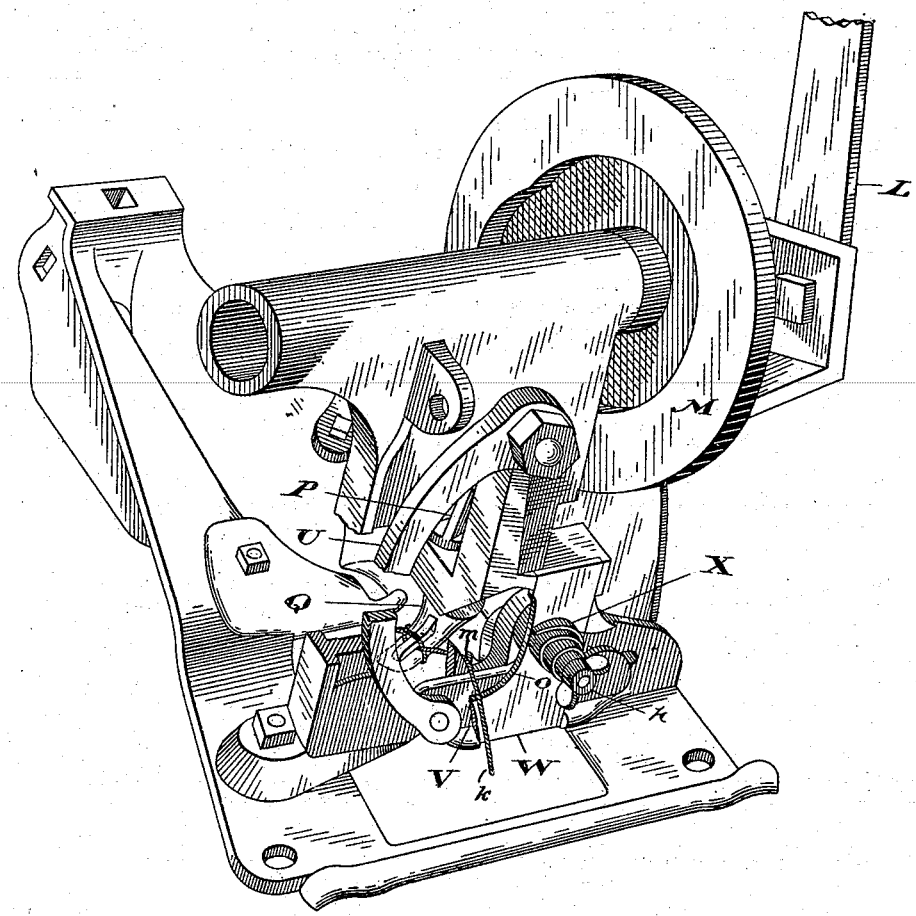
Figure 5:
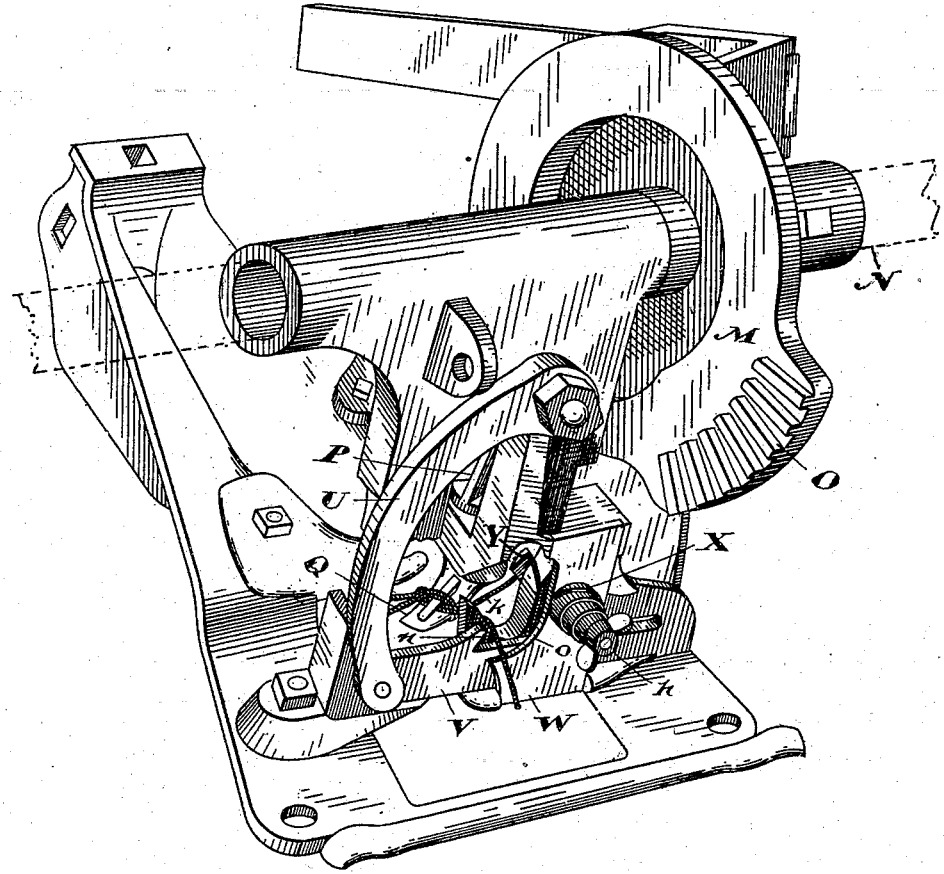
Figure 6:
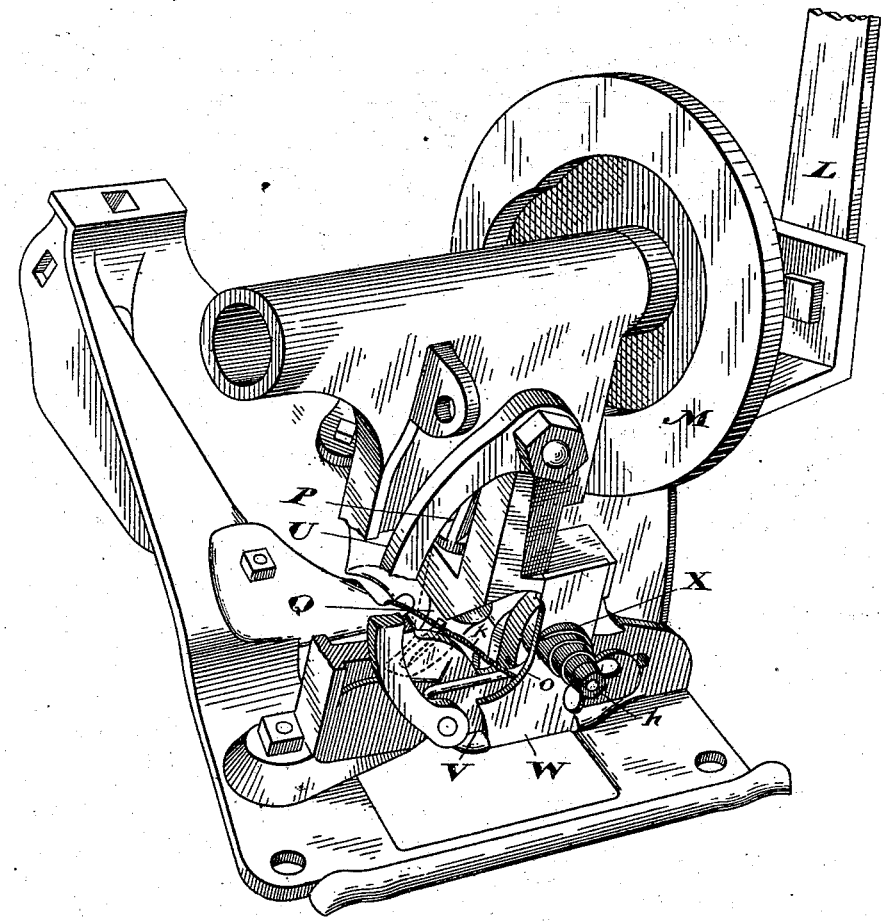

Figure 1, is a perspective view of the binding table with the needle in its initial position. Fig. 2, is a similar view showing the position of the parts when the knot is being effected. Fig. 3, is a detail of the parts by which the tripping mechanism is put into motion. Fig. 3ª, is a detail of the bolt shown in Fig. 3. Figs. 4, 5, and 6, are details of the knotter showing the cord holder. Fig. 7, is a rear view of the knotter showing the cut of the knife. Fig. 8, is a plan of the breast plate. Fig. 9 is a vertical section of the cord-holder, on a line through the center of the tension spring. Fig. 10 is a section of part of the breast-plate, showing the shape of the underside of point $v$.

Like letters of reference indicate corresponding parts in each view.

A, is the needle shaft to which the needle B, is fixed in the usual way.

C, is an arm loosely journaled on the needle shaft A. One end of this arm extends back immediately below the needle B, against which it butts, as indicated in Fig. 1. The other end of this arm extends forward and has an extension D, which forms a support for the drop board E. The trip plate F, is hinged to the table at $a$, and is supported by the upright G, which extends from the arm C, as shown.

H, is a curved plate connected to the frame of the binding table and extending through a slot in the arm C.

When the grain is being packed into a sheaf, it presses against the trip plate F, which plate being hinged or pivoted as shown, is forced down pressing against the upright G, causing the arm C, to rock on its pivot forcing the rear end of the said arm against the needle, B, which is thereby raised until its shaft A, is revolved sufficiently to trip the mechanism by which the needle shaft and parts connected therewith are put into action.

When the needle B, is put into motion, it moves away from the rear end of the arm C, permitting the front end of the arm C, to fall until the hooked end of its bolt J, comes in contact with the shoulder, $b$, formed on the curved plate H, as indicated. As the needle B, continues to revolve, its heel I, comes in contact with the bolt J, which being supported by a spring K, (see Fig. 3) recedes down sufficiently to permit the heel of the needle to pass. At this period, the needle compresses the sheaf and puts the cord around it. When the needle commences to return to its initial position, the heel I, immediately comes in contact with the end of the bolt J, pushing the said bolt longitudinally so as to carry its hooked end clear of the shoulder $b$, permitting the arm C, to fall by its own gravity into the position indicated in Fig. 2, permitting the trip plate F, and the drop board E, to fall clear of the sheaf which is then immediately thrown off the machine by the action of the discharge arms L. By the time that the sheaf is discharged, the back of the needle B comes in contact with the rear end of the arm C, rocking the said arm so as to bring the upright, G, in contact with the trip plate, F, and the extension, D, with the drop board E, thereby forcing the trip plate F, and drop board E, into the position they are shown in Fig. 1.

As our invention has nothing whatever to do with the construction of the trip mechanism herein referred to, we do not illustrate it, nor is it necessary to enter into a description of it, as every harvester binder is provided with trip mechanism by which the needle shaft and parts connected therewith are put into action. During the period that the needle and its parts are moving, as described, the cord is carried around the bundle and knotted. The parts of the mechanism for effecting this purpose are as follows:—

M, is a cam wheel fixed to the knotter shaft N, and revolving therewith. The gear segment, O, formed on the cam wheel, M, engages with the spur pinion P, formed upon or fixed to the spindle of the bill hook, Q.

R, is an arm fixed to the spindle, S, which is suitably journaled in the knotter frame, T, and has on it and opposite to the arm, R, an arm, U, the opposite end of which arm is connected to the push-plate V. This push plate passes between the frame of the knotter and the tension plate W, which is held in position by a suitable spring X. On one side of the frame, T, opposite to that on which the push plate V, is placed, we pivot at, $d$, a knife Y, (see Fig. 7.) A pin, Z, projects from the plate, V, through a slot, $e$, made in the frame, T. This pin fits into a curved slot, $f$, made in the knife, Y. All the parts so connected together are arranged so that the movement of the arm R, shall put each part in motion at the time it is required to act. To effect this movement, the arm, R, projects into a cam groove made in the face of the cam wheel, M, (see Fig. 7,) which cam groove is shaped so as to give the arm the necessary movement during the revolving of the cam wheel, M. On reference to Fig. 9, it will be seen that the spring, X, fits over a stud, $g$, which projects from the frame, P, and is provided with a nut, $h$, so that the pressure of the spring, X, against the tension plate W, may be increased or decreased at pleasure. When the needle first enters the knotter, it lays the cord, $k$ in the position indicated in Fig. 4, the bill hook having revolved and grasped the cord. At this time the hook part of the plate, V, is behind the tension plate, W, and the cord, $k$, is clear of the hook, $m$, formed on the back of the knife, Y. Before the needle has finished its forward stroke, the push plate, V, is drawn out to the position shown in Fig. 5, the cord, $k$, being held taut at this time. Owing to the position of the needle, it will be drawn in position ready to be caught by the hook, $n$. Just before the needle commences to return, the push plate, V, begins to move back again toward the tension plate. The hook, $n$, formed on the push plate, V, catches the cord, $k$, and forces it (as shown in Fig. 6) between the knotter frame and the tension plate W, which acts as a cord holder to fasten this end of the cord until the needle has returned from its initial position with the cord to surround the sheaf. While the cord, $k$, is being released by the withdrawal of the push plate from the cord holder, the knife Y, which had fallen below the cord, $k$, commences to rise and catches the said cord in the hook, $m$, formed in the back of the said knife, raising the cord into the position indicated in Fig. 5, so that it is clear of the cutting edge of the knife as indicated in Fig. 5. The knot is by this time in a position to be pulled off the bill hook, Q, the knife Y, descending and cutting the single cord which has been carried around the sheaf by the needle. It will thus be observed by our arrangement only one cord has to be cut by the knife Y. It will be observed that the tension plate W, has a curved extension, $o$, against which the cord $k$, is pressed by the forward action of the push plate V, raising the cord above and in the path of the upward movement of the knife so that the hook $m$, will assuredly come in contact with and raise the cord. Before this motion takes place, the cord lies in a notch (see Fig. 4) formed by the back of the hook $m$ and the plate $p$. To get the cord in a position to be raised by said hook $m$ it is necessary that the cord be raised above its point and at the same time into the path of the said hook, and the combination of the upward and sidewise motion produced by the curved extension $o$ accomplishes the result desired. On reference to Fig. 7, it will be observed that we place the plate, $p$, on the frame T. The knife Y, passes between this plate, $p$, and the frame T. This plate supports the cord, $k$, while it is being cut by the action of the knife. It is also shaped, as indicated, to hold the cord while the jaws of the bill hook are open and revolving to grasp the cord. The plate $p$ is shaped and placed as shown, so that the projecting finger at the bottom holds up the cord while it is being cut and the curved vertical edge prevents the cord being drawn sidewise while the jaws of the bill-hook are revolving to grasp it.

On reference to Figs. 8 and 10, our improved formation of cord slot in the breast plate will be understood. A half moon recess, $q$, is made on one side of the cord slot, $r$, at a point where it is desired to hold the cord while the knot is being effected. On the opposite side of the cord slot, $r$, a plate, $s$, is fixed having a hooked end, $t$, which projects into the half moon recess, $q$, as shown. One point of the plate forming the half moon recess, $q$, overlaps the plate, $s$, leaving just sufficient space beneath to permit the cord to enter the said recess. This point overlapping the plate, $s$, prevents the cord escaping from the recess, $q$, and the shape of the half moon recess, $q$, forces the cord up the bill hook during its revolution. The hook-shaped point, $t$, of the plate, $s$, holds the cord in position and prevents its slipping off the bill hook before it begins to revolve. On reference to Fig. 10, the shape of the bottom side of the point, $v$, is shown. A downward projection, $w$, is formed on the bottom of the point, $v$, which projection prevents the cord slipping off the point until the bill hook has grasped the cord.

What we claim as our invention is—

1. A hinged trip plate against which the grain to form the sheaf is packed, an upright extending from an arm journaled on the needle shaft and extending below the needle fixed to its shaft, a drop board hinged to the grain table and supported by an extension projecting from the journaled arm, substantially as and for the purpose specified.

2. A hinged trip plate against which the grain to form the sheaf is packed, an upright extending from an arm journaled on the needle shaft, a bolt J, connected to the journaled arm and arranged to engage with the curved plate H, in combination with a heel projecting from the needle, substantially as and for the purpose specified.

3. A bolt, J, connected to the arm, C, and supported by spring, K, a hook formed on the end of the bolt to engage with a curved plate, H, in combination with a heel projecting from the needle, substantially as and for the purpose specified.

4. An arm fixed to a spindle journaled in the knotter frame and arranged to engage with a cam wheel, an arm fixed to the opposite end of the said journaled spindle and arranged to support one end of the plate, V, which extends behind the tension plate, W, where it is supported by the pin Z, extending through the slot, $e$, in the knotter frame, T, in combination with the spring, X, stud, $g$, and nut, $h$, substantially as and for the purpose specified.

5. A knife, Y, pivoted on the inner side of the knotter frame, T, in combination with a pin, Z, extending from the push plate V, into a slot, $f$, made in the knife Y, substantially as and for the purpose specified.

6. A knife, Y, pivoted on the inner side of the knotter frame, T, and having a hook, $m$, formed on its back in combination with a pin, Z, extending from the push plate, V, into a slot, $f$, made in the knife, Y, substantially as and for the purpose specified.

7. In a harvester binder, a vibratory pivoted knife Y having a hook $m$, and a tension plate W formed with an extension $o$, in combination with a push plate V provided with a hook $n$ having its acting side slightly inclined as shown, substantially as and for the purpose specified.

8. A breast plate having a half moon recess, $q$, formed on one side of the cord slot, $r$, one end of the plate in which the half moon recess is formed projecting over the plate, $s$, fixed on the opposite side of the said slot and having a curved or hook-shaped point, $t$, projecting in the half moon recess, substantially as and for the purpose specified.

9. A breast plate having a half moon recess, $q$, formed on one side of the cord slot, $r$, one end of the plate in which the half moon recess is formed projecting over the plate, $s$, fixed on the opposite side of the said slot and having a curved or hook-shaped point, $t$, projecting into the half moon recess, the point, $v$, of which having a downward projection, $w$, formed on its bottom, substantially as and for the purpose specified.

Alliston, October 3, 1891.

JOHN S. MERCER.
WILLIAM GREATREX.

In presence of—
A. W. HANN,
J. S. BROOKS.